(12) United States Patent
Muneto

(10) Patent No.: US 10,730,191 B2
(45) Date of Patent: Aug. 4, 2020

(54) MONITORING DEVICE OF ROBOT SYSTEM

(71) Applicant: KAWASAKI JUKOGYO KABUSHIKI KAISHA, Kobe-shi, Hyogo (JP)

(72) Inventor: Koji Muneto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 315 days.

(21) Appl. No.: 15/772,160

(22) PCT Filed: Oct. 25, 2016

(86) PCT No.: PCT/JP2016/004694
§ 371 (c)(1),
(2) Date: Apr. 30, 2018

(87) PCT Pub. No.: WO2017/073052
PCT Pub. Date: May 4, 2017

(65) Prior Publication Data
US 2018/0311836 A1 Nov. 1, 2018

(30) Foreign Application Priority Data
Oct. 30, 2015 (JP) .................................. 2015-213711

(51) Int. Cl.
*B25J 19/06* (2006.01)
*B25J 9/16* (2006.01)
(Continued)

(52) U.S. Cl.
CPC ........... *B25J 19/063* (2013.01); *B25J 9/1633* (2013.01); *B25J 9/1674* (2013.01); *B25J 13/085* (2013.01);
(Continued)

(58) Field of Classification Search
CPC ...... B25J 19/063; B25J 9/1633; B25J 9/1674; B25J 19/06; B25J 13/085; B25J 13/084;
(Continued)

(56) References Cited

U.S. PATENT DOCUMENTS 6,243,624 B1 * 6/2001 Wu ..................... B25J 9/1605
318/561
6,826,450 B2 * 11/2004 Watanabe .............. B25J 9/1638
219/124.34
(Continued)

FOREIGN PATENT DOCUMENTS

CN 102387900 B 6/2015
CN 104908047 A 9/2015
(Continued)

OTHER PUBLICATIONS

Morito et al., Reaction force observer using load dependent friction model, 2018, IEEE, p. 423-428 (Year: 2018).*
(Continued)

*Primary Examiner* — McDieunel Marc
(74) *Attorney, Agent, or Firm* — Oliff PLC

(57) ABSTRACT

A monitoring device of a robot system including: a current sensor detecting a value of a current flowing through the servo motor; a current/torque converting the value of the current flowing through the servo motor which is detected by the current sensor into a torque value; a driving torque estimating section estimating at least a part of driving torque required to drive the servo motor; a differential torque calculating differential torque between the torque value obtained by conversion in the current/torque converting section and an estimated value of the driving torque; an external force converting the differential torque calculated by the differential torque calculating section into an external force applied to the robot; and a stop signal generating section which generates to stop the robot based on a value
(Continued)

of the external force obtained by conversion in the external force converting section, and supplies the stop signal to the controller.

20 Claims, 8 Drawing Sheets

(51) Int. Cl.
    *B25J 13/08*     (2006.01)
    *G01L 5/00*     (2006.01)
    *G01L 5/22*     (2006.01)

(52) U.S. Cl.
    CPC .............. *B25J 19/06* (2013.01); *G01L 5/0052* (2013.01); *G01L 5/226* (2013.01); *G05B 2219/37285* (2013.01); *G05B 2219/37624* (2013.01); *G05B 2219/39353* (2013.01); *G05B 2219/41372* (2013.01)

(58) Field of Classification Search
    CPC ..... B25J 9/1638; B25J 9/1605; G01L 5/0052; G01L 5/226; G05B 2219/37285; G05B 2219/37624; G05B 2219/39353; G05B 2219/41372; B62D 57/032; B62D 57/02
    See application file for complete search history.

(56) References Cited

U.S. PATENT DOCUMENTS

| | | | | |
|---|---|---|---|---|
| 7,212,886 B2 * | 5/2007 | Nagata | ................. | B25J 9/1633 318/568.12 |
| 7,324,872 B2 * | 1/2008 | Nagasaka | .............. | B25J 13/084 318/568.1 |
| 7,386,364 B2 * | 6/2008 | Mikami | ................. | B62D 57/02 318/443 |
| 7,664,569 B2 * | 2/2010 | Shimizu | ............... | B62D 57/032 700/245 |
| 8,204,626 B2 * | 6/2012 | Yoshiike | .............. | B62D 57/032 250/332 |
| 8,369,992 B2 * | 2/2013 | Barajas | .................. | B25J 9/1674 601/33 |
| 2011/0060460 A1 | 3/2011 | Oga et al. | | |
| 2015/0258690 A1 | 9/2015 | Naitou | | |

FOREIGN PATENT DOCUMENTS

| | | |
|---|---|---|
| JP | H10-156771 A | 6/1998 |
| JP | H11-042575 A | 2/1999 |
| JP | H11-042576 A | 2/1999 |
| JP | H11-042577 A | 2/1999 |
| JP | H11-042578 A | 2/1999 |
| JP | 2002-283276 A | 10/2002 |
| JP | 2006-075931 A | 3/2006 |
| JP | 2006-123012 A | 5/2006 |
| JP | 2014-042984 A | 3/2014 |
| KR | 10-2009-0114890 A | 11/2009 |
| WO | 2010/108518 A1 | 9/2010 |

OTHER PUBLICATIONS

Wada et al., Practical modeling and system identification of R/C servo motors, 2009, IEEE, p. 1378-1383 (Year: 2009).*
Udai et al., Parallel active/passive force control of industrial robots with joint compliance, 2014, IEEE, p. 4511-4516 (Year: 2014).*
Leonhard, Trajectory control of a multi-axes robot with electrical servo drives, 1990, IEEE, p. 3-9 (Year: 1990).*

* cited by examiner

MONITORING DEVICE OF ROBOT SYSTEM

TECHNICAL FIELD

The present invention relates to a monitoring device of a robot system.

BACKGROUND ART

Conventionally, there is known a controller which controls a robot so that the robot follows an external force applied to the robot, without using a force sensor (see Patent Literature 1~Patent Literature 5). This controller detects a value of a current flowing through a motor for driving each of joint axes of the robot and a rotational speed of the motor, calculates disturbance torque exerted on the robot, and changes a position command value based on the disturbance torque.

In recent years, to increase productivity, it has been proposed that a robot and operators work cooperatively in the same work space. To secure safety, various techniques for monitoring the operation (movement) of the robot and detecting a collision with high accuracy have been developed (see Patent Literature 6 and Patent Literature 7). For example, a controller disclosed in Patent Literature 7 performs inverse dynamics calculation based on the rotational angle of a motor which is detected, and a load weight and a center-of-gravity position of a robot arm which are input, to derive a value of a motor current required to drive the motor. Then, the controller calculates a difference between the calculated value of the motor current and a current value detected from the motor, as a value of a disturbance current generated due to a collision.

CITATION LIST

Patent Literature

Patent Literature 1: Japanese-Laid Open Patent Application Publication No. Hei. 10-156771
Patent Literature 2: Japanese-Laid Open Patent Application Publication No. Hei. 11-042575
Patent Literature 3: Japanese-Laid Open Patent Application Publication No. Hei. 11-042576
Patent Literature 4: Japanese-Laid Open Patent Application Publication No. Hei. 11-042577
Patent Literature 5: Japanese-Laid Open Patent Application Publication No. Hei. 11-042578
Patent Literature 6: Japanese-Laid Open Patent Application Publication No. 2006-075931
Patent Literature 7: Japanese-Laid Open Patent Application Publication No. 2006-123012

SUMMARY OF INVENTION

Technical Problem

However, in the conventional configuration disclosed in Patent Literature 7, since the collision is detected based on the value of the current of the motor for driving each of the joint axes of the robot, the collision cannot be detected with high accuracy.

In view of the above-described circumstances, an object of the present invention is to provide a monitoring device of a robot system capable of detecting a collision of a robot during the operation of the robot.

Solution to Problem

To solve the above-described problem, according to an aspect of the present invention, there is provided a monitoring device of a robot system, the robot system including: a robot including at least one joint axis and at least one servo motor which drives the joint axis, and a controller which controls the servo motor which drives the joint axis, the monitoring device comprising: a current sensor which detects a value of a current flowing through the servo motor; a current/torque converting section which converts the value of the current flowing through the servo motor which has been detected by the current sensor into a torque value; a driving torque estimating section which estimates at least a part of driving torque required to drive the servo motor; a differential torque calculating section which calculates differential torque between the torque value obtained by conversion in the current/torque converting section and an estimated value of the driving torque; an external force converting section which converts the differential torque calculated by the differential torque calculating section into an external force applied to the robot; and a stop signal generating section which generates a stop signal for the robot based on a value of the external force obtained by conversion in the external force converting section, and supplies the stop signal to the controller.

In accordance with this configuration, the value of the current flowing through the motor which drives the joint axis (each of the joint axes) of the robot is detected, the detected current value is converted into the torque value, and then the torque value is converted into the value of the external force applied to the robot. Since the value of the external force applied to the robot is directly calculated, a collision of the robot can be detected with high accuracy during the operation of the robot. Since the stop signal is generated based on the value of the external force, a manager can easily set a threshold or the like.

According to another aspect of the present invention, there is provided a monitoring device of a robot system, the robot system including: a robot including at least one joint axis and at least one servo motor which drives the joint axis, and a controller which controls the servo motor which drives the joint axis, the monitoring device comprising: a current sensor which detects a value of a current flowing through the servo motor; a current/external force converting section which converts the value of the current flowing through the servo motor which has been detected by the current sensor into a detection value of an external force applied to the robot; a driving torque estimating section which estimates at least a part of driving torque required to drive the servo motor; a torque/external force converting section which converts an estimated value of the driving torque into an estimated value of the external force applied to the robot; an external force converting section which calculates a difference between the detection value of the external force applied to the robot and the estimated value of the external force applied to the robot to obtain the external force applied to the robot; and a stop signal generating section which generates a stop signal for the robot based on a value of the external force obtained by conversion in the external force converting section, and supplies the stop signal to the controller.

According to another aspect of the present invention, there is provided a monitoring device of a robot system, the robot system including: a robot including at least one joint axis and at least one servo motor which drives the joint axis, and a controller which controls the servo motor which drives the joint axis, the monitoring device comprising: a current sensor which detects a value of a current flowing through the servo motor; a current estimating section which estimates the value of the current flowing through the servo motor; a differential current calculating section which calculates a differential current between a detection value of the current flowing through the servo motor and an estimated value of the current flowing through the servo motor; an external force converting section which converts the differential current calculated by the differential current calculating section into an external force applied to the robot; and a stop signal generating section which generates a stop signal for the robot based on a value of the external force obtained by conversion in the external force converting section, and supplies the stop signal to the controller.

According to another aspect of the present invention, there is provided a monitoring device of a robot system, the robot system including: a robot including at least one joint axis and at least one servo motor which drives the joint axis, and a controller which controls the servo motor which drives the joint axis, the monitoring device comprising: a current sensor which detects a value of a current flowing through the servo motor; a first current/torque converting section which converts the value of the current flowing through the servo motor which has been detected by the current sensor into a detection value of torque; a current estimating section which estimates the value of the current flowing through the servo motor; a second current/torque converting section which converts an estimated value of the current flowing through the servo motor which has been obtained by the current estimating section into an estimated value of the torque; a differential torque calculating section which calculates differential torque between a detection value of the torque and the estimated value of the torque; an external force converting section which converts the differential torque calculated by the differential torque calculating section into an external force applied to the robot; and a stop signal generating section which generates a stop signal for the robot based on a value of the external force obtained by conversion in the external force converting section, and supplies the stop signal to the controller.

According to another aspect of the present invention, there is provided a monitoring device of a robot system, the robot system including: a robot including at least one joint axis and at least one servo motor which drives the joint axis, and a controller which controls the servo motor which drives the joint axis, the monitoring device comprising: a current sensor which detects a value of a current flowing through the servo motor; a current estimating section which estimates the value of the current flowing through the servo motor; a first current/external force converting section which converts the value of the current flowing through the servo motor which has been detected by the current sensor into a detection value of an external force applied to the robot; a second current/external force converting section which converts an estimated value of the current flowing through the servo motor which has been obtained by the current estimating section into an estimated value of the external force applied to the robot; an external force converting section which calculates a difference between the detection value of the external force applied to the robot and the estimated value of the external force applied to the robot, to obtain the external force applied to the robot; and a stop signal generating section which generates a stop signal for the robot based on a value of the external force obtained by conversion in the external force converting section, and supplies the stop signal to the controller.

The stop signal generating section may generate the stop signal for the robot, in a case where the value of the external force which has been obtained by conversion in the external force converting section is larger than a preset first threshold.

In a case where the threshold used to determine occurrence of a collision is the current value, the manager is required to estimate the external force applied to the robot from the current value, and it is difficult to set the threshold. In accordance with the above-described configuration, it is determined whether or not the value of the external force applied to the robot is larger than (has exceeded) the preset threshold. Therefore, the manager can easily set the threshold. In this way, the external force value, for example, 100 N can be set as the threshold.

The monitoring device of the robot system may further comprise: a low pass filter which receives as an input the value of the external force obtained by conversion in the torque/external force converting section, and the stop signal generating section may generate the stop signal for the robot, in a case where an output value of the low pass filter is larger than a preset second threshold.

In this configuration, by use of the low pass filter, it becomes possible to suitably perform collision determination while suppressing a noise component without excessively responding to a change in the external force momentarily applied to the robot.

In the above-described monitoring device of the robot system, the torque may be converted into the external force applied to the robot and the current may be converted into the external force applied to the robot by calculation by use of Jacobian matrix in which a specified point (e.g., the tip end of the robot) of the robot is an application point of the external force.

Advantageous Effects of Invention

In accordance with the present invention, it becomes possible to provide a monitoring device of a robot system which is capable of detecting a collision of a robot during the operation of the robot.

DESCRIPTION OF EMBODIMENTS

Hereinafter, the embodiments of the present invention will be described with reference to the drawings. Throughout the drawings, the same or corresponding constituents are designated by the same reference symbols and will not be described in repetition.

[Robot System]

Figure 1:
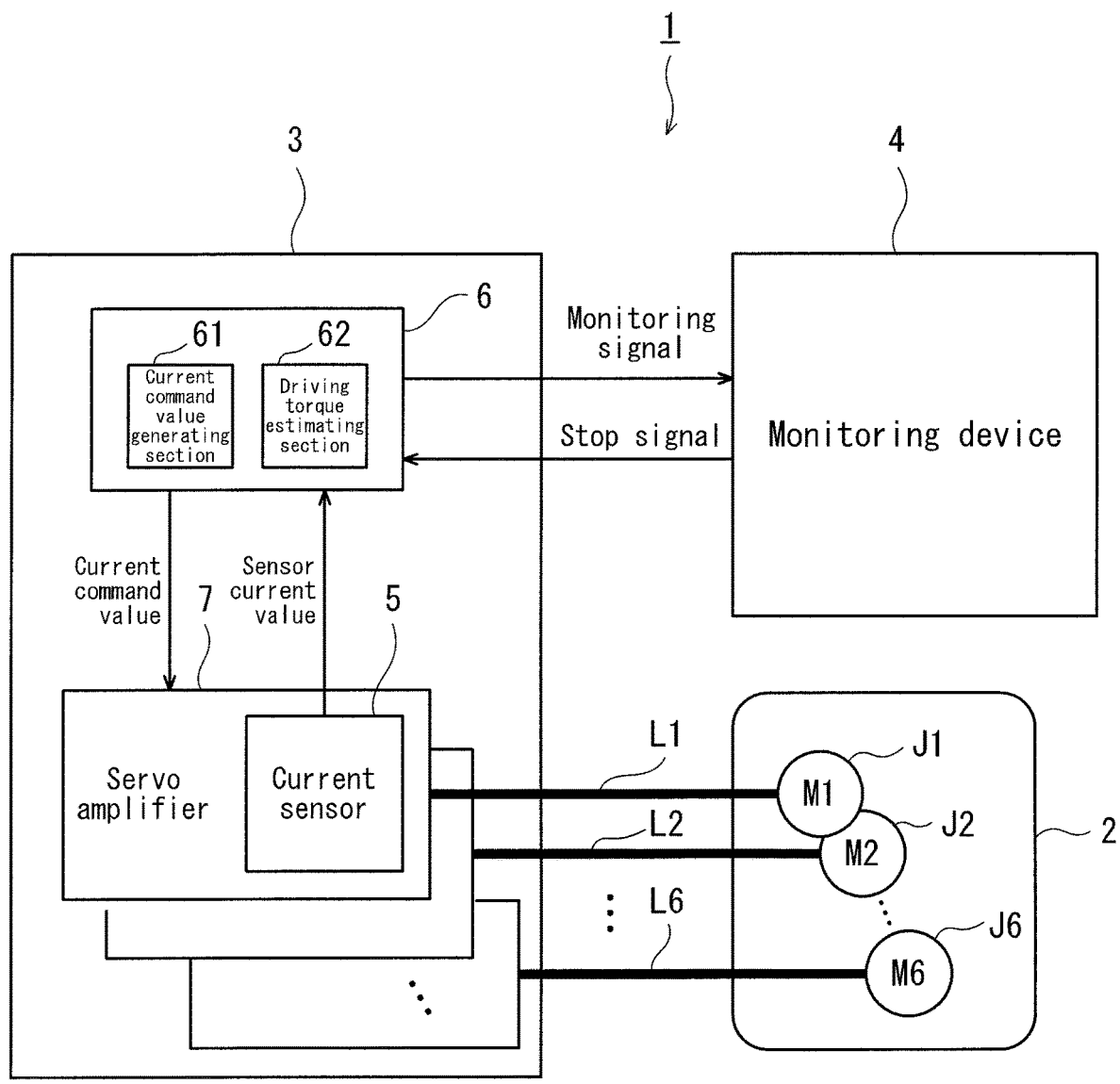
FIG. 1 is a block diagram showing the overall configuration of a robot system including a monitoring device according to Embodiment 1 of the present invention.

FIG. 1 is a block diagram showing the overall configuration of a robot system including a monitoring device according to Embodiment 1 of the present invention. As shown in FIG. 1, a robot system 1 includes a robot 2, a controller 3, and a monitoring device 4. In the robot system 1, the robot 2 and operators work cooperatively in the same work space. To this end, the robot system 1 for the present embodiment includes the monitoring device 4 of the robot 2 to improve safety for the operators.

The robot 2 includes at least one joint axis (one or more joint axes), and at least one servo motor (one or more servo motors) for driving the joint axis. In the present embodiment, the robot 2 includes six joint axes J1 to J6, and six servo motors M1 to M6 for driving these joint axes J1 to J6, respectively. The robot 2 is a 6-axis articulated robot (multi joint robot). The servo motors M1 to M6 are provided with current sensors 5, respectively, which detect currents for driving the servo motors M1 to M6, brakes (not shown) which brake the rotations of the servo motors M1 to M6, respectively, and position sensors (not shown) such as encoders which detect the rotational angular positions of the servo motors M1 to M6, respectively. The rotational angular positions of the servo motors M1 to M6 are defined as the angular positions (hereinafter will also be referred to as joint axis angular positions) of the joint axes J1 to J6, respectively, in a joint coordinate system of the servo motors M1 to M6.

The controller 3 is connected to the robot 2 via cables L1 to L6 (indicated by bold lines). Each of the cables L1 to L6 includes a power supply line used to supply electric power to corresponding one of the servo motors M1 to M6 or corresponding one of the brakes corresponding to the joint axes J1 to J6, respectively, a signal line used to send to the controller 3 a sensor signal from corresponding one of the position sensors (not shown) attached on the servo motors M1 to M6, or the like. The controller 3 is configured to control each of the servo motors M1 to M6 which drive the joint axes J1 to J6, respectively, based on the position command value.

The controller 3 is connected to the monitoring device 4 via a communication cable (not shown). The communication cable is a cable for serial communication such as RS 422. The controller 3 is configured to supply monitoring signals to the monitoring device 4 and to stop (shut-down) the operation of the robot 2 in a case where the controller 3 receives a stop signal from the monitoring device 4.

The controller 3 is a robot controller including a processor 6, servo amplifiers 7, a memory, an input/out interface, a communication interface, or the like. The processor 6 includes a current command value generating section 61, and a driving torque estimating section 62. The current command value generating section 61 and the driving torque estimating section 62 are functional blocks implemented by execution of specified programs in the processor 6. The current command value generating section 61 is configured to calculate a current command value based on a predetermined position command value and a joint axis angular position from the position sensor, and outputs the current command value to corresponding one of the servo amplifies 7. The servo amplifiers 7 are provided to correspond to the servo motors M1 to M6, respectively. Each of the servo amplifiers 7 is configured to generate the current based on the current command value provided to the servo amplifier 7, and supply the generated current to corresponding one of the servo motors M1 to M6, via corresponding one of the cables L1 to L6. In brief, the servo amplifiers 7 are amplifiers which generate driving currents for the servo motors M1 to M6 based on the current command values, respectively. Thus, the controller 3 is configured to control the positions of the servo motors M1 to M6 provided at the joint axes J1 to J6 based on the position command values, respectively.

The driving torque estimating section 62 is configured to eliminate driving torque required to drive each of the servo motors M1 to M6 of the joint axes J1 to J6 of the robot 2. In the present embodiment, the driving torque estimating section 62 is configured to calculate gravitational force torque, inertia force torque, and frictional force torque, and adds the gravitational force torque, the inertia force torque, and the frictional force torque to obtain the estimated values of the driving torque. The gravitational force torque is defined as torque required to overcome the weight of each of the links to maintain the posture. The inertia force torque is defined as torque required to overcome the inertia of each of the links. The frictional force torque is defined as torque required to overcome the friction of a speed reduction unit. The controller 3 sends the monitoring signals which are the estimated values of the driving torque and the sensor current values detected by the current sensors 5, to the monitoring device 4.

The monitoring device 4 is configured to monitor the operation of the robot 2 in the robot system 1 to detect a collision. The monitoring device 4 is configured to receive the monitoring signals (sensor current values, estimated values of driving torque) of the robot 2 from the controller 3 and to supply a stop signal to the controller 3 in a case where the monitoring device 4 detects a collision. To improve the safety for the operators working together with the robot 2, the monitoring device 4 is provided independently of the controller 3. For example, the controller 3 and the monitoring device 4 are accommodated in one casing (housing).

[Monitoring Device]

Figure 2:
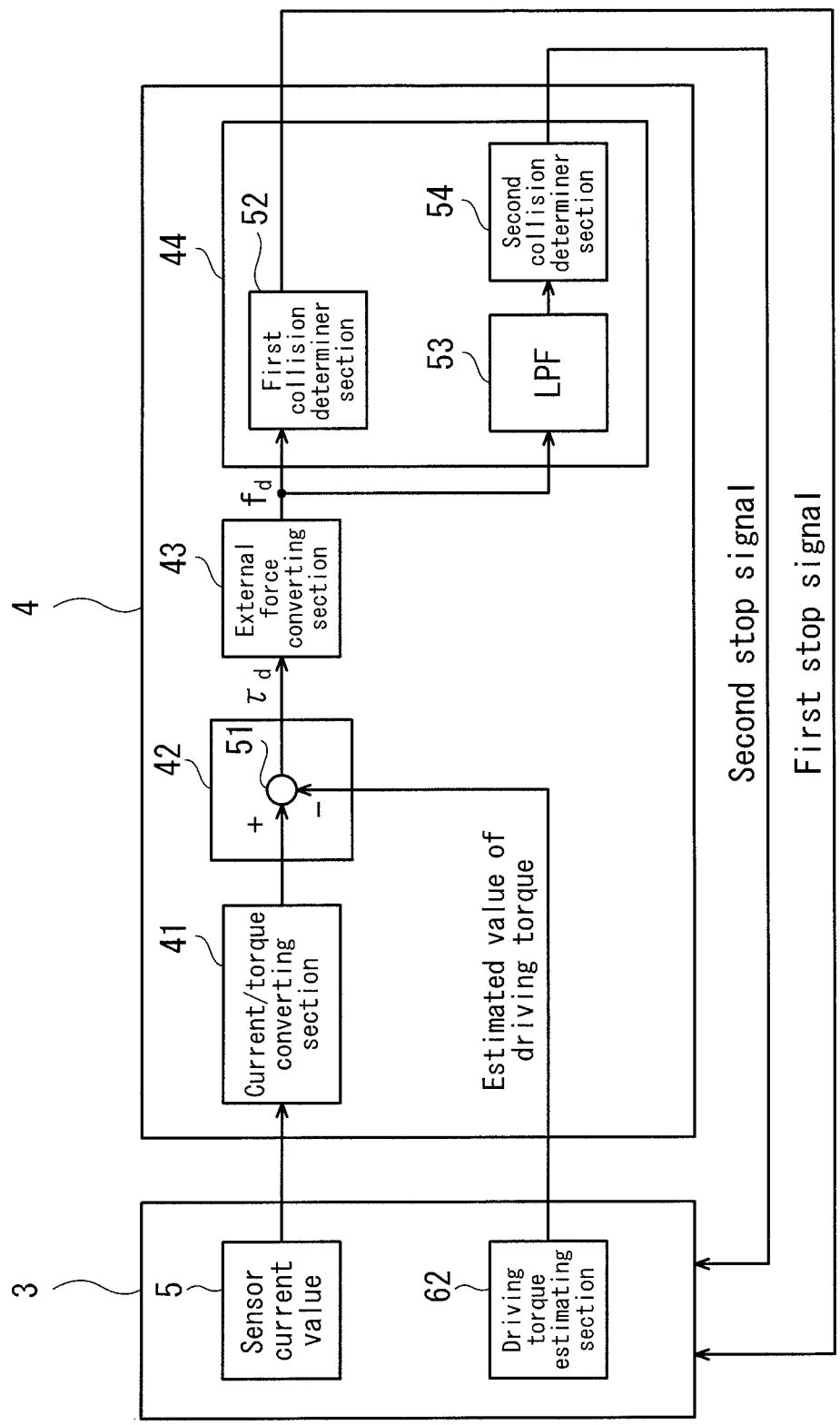
FIG. 2 is a block diagram showing the configuration of the monitoring device of FIG. 1.

Next, the specific configuration of the monitoring device 4 will be described with reference to the block diagram of FIG. 2. As shown in FIG. 2, the monitoring device 4 includes a current/torque converting section 41, a differential torque calculating section 42, an external force converting section 43, and a stop signal generating section 44. The monitoring device 4 is a computer including at least one processor, a memory, an input/output interface, a communication interface, or the like. In the monitoring device 4, a manager can adjust a threshold used to detect a collision into a desired value. The sections 41 to 44 are functional blocks implemented by execution of specified programs in a processor.

The current/torque converting section 41 is configured to convert the values of the sensor currents flowing through the servo motors M1 to M6, which are detected by the current sensors 5, into torque values. The sensor current values detected by the current sensors 5, which are the monitoring signals, are sent from the controller 3 to the monitoring device 4 via the communication cable, and input to the current/torque converting section 41. The current/torque converting section 41 is configured to convert the input sensor current values into the torque values, and output the torque values to the differential torque calculating section 42.

The differential torque calculating section 42 is configured to calculate as differential torque values, differences between the torque values obtained by the conversion in the current/torque converting section 41 and the estimated values of the driving torque. After calculated by the driving torque estimating section 62, the estimated values of the driving torque which are the monitoring signals are sent from the controller 3 to the monitoring device 4 via the communication cable, and input to the differential torque calculating section 42. Although in the present embodiment, the controller 3 includes the driving torque estimating section 62, the monitoring device 4 may include the driving torque estimating section 62. In the present embodiment, the differential torque calculating section 42 includes an adder/subtracter 51. The adder/subtracter 51 is configured to calculate the differential torque values by subtracting the estimated values of the driving torque received from the driving torque estimating section 62, from the torque values of the servo motors M1 to M6 received from the current/torque converting section 41, and to output the differential torque values to the external force converting section 43.

The external force converting section 43 is configured to convert the differential torque values calculated by the differential torque calculating section 42 into the value of an external force applied to the robot 2 and output the external force value to the stop signal generating section 44.

The stop signal generating section 44 is configured to generate a stop signal for the robot 2 based on a scalar value of the external force obtained by conversion in the external force converting section 43, and to supply the stop signal to the controller 3. In the present embodiment, the stop signal generating section 44 includes a first collision determiner section 52, a low pass filter 53, and a second collision determiner section 54.

The first collision determiner section 52 is configured to determine whether or not the external force value $|f_d|$ received from the external force converting section 43 is larger than a preset first threshold $f_{th1}$. In a case where the first collision determiner section 52 determines that the external force value $|f_d|$ is larger than the first threshold $f_{th1}$, the first collision determiner section 52 is configured to determine that the robot 2 has collided with the operator, to generate a first stop signal, and to output the first stop signal to the controller 3. In the present embodiment, the first threshold $f_{th1}$ is set to 100 N. The external force value $|f_d|$ to be compared to the first threshold $f_{th1}$, is the scalar value of the external force value $f_d$.

The low pass filter 53 is configured to perform a filtering operation by use of as an input the external force value $f_d$ obtained by the conversion in the external force converting section 43, and to output the resulting value to the second collision determiner section 54.

The second collision determiner section 54 is configured to determine whether or not the output value of the low pass filter 53 is larger than a preset second threshold $f_{th2}$. In a case where the second collision determiner section 54 determines that the output value of the low pass filter 53 is larger than the second threshold $f_{th2}$, the second collision determiner section 54 is configured to generate a second stop signal and to output the second stop signal to the controller 3. In the present embodiment, the second threshold $f_{th2}$ is set to 80 N. The output value of the low pass filter 53 to be compared to the second threshold $f_{th2}$ is also a scalar value.

[Operation of Robot]

Next, the operation of the robot 2 in the robot system 1 configured as descried above will be described with reference to FIG. 1.

The controller 3 calculates current command values based on the predetermined position command values and joint axis angular position information from the position sensors. The servo amplifiers 7 generate currents based on the current command values and supply the currents to the servo motors M1 to M6 via the cables L1 to L6, respectively. When the currents are flowed through the servo motors M1 to M6, the joint axis angles of the joint axles J1 to J6 are changed, and the tip end of the hand of the robot 2 is moved to a desired (target) position. In this way, the controller 3 controls the positions of the servo motors M1 to M6 provided at the joint axles J1 to J6, respectively, based on the position command values.

[Monitoring of Robot]

Figure 3:
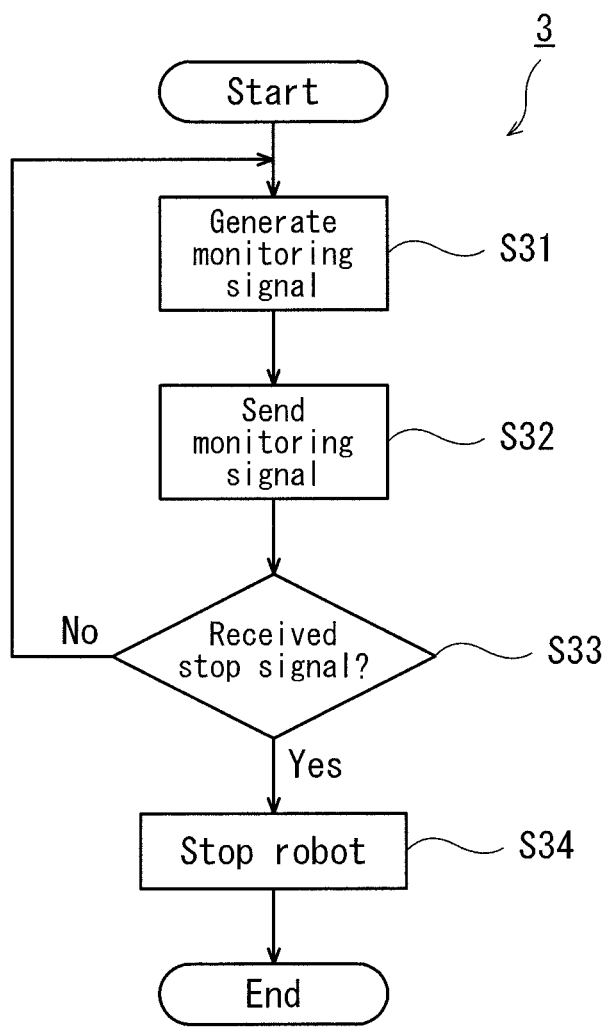
FIG. 3 is a flowchart showing a flow of processing performed by a controller.

Next, monitoring of the operation of the robot 2 in the robot system 1 will be described with reference to the flowcharts of FIGS. 3 and 4. As shown in FIG. 3, initially, the controller 3 generates the monitoring signals required to monitor the operation (movement) of the robot 2 (step S31 of FIG. 3). The controller 3 causes the current sensors 5 to detect the sensor current values, and causes the driving torque estimating section 62 to derive the estimated values of the driving torque, as the monitoring signals (see FIG. 1). The driving torque estimating section 62 calculates driving axis speeds by taking, for example, temporal (time) subtraction from the joint axis angular positions calculated by the position sensors. Then, the driving torque estimating section 62 reads friction coefficients pre-stored in the memory, and calculates the frictional force torque corresponding to coulomb friction, viscous friction, or the like, from the calculated driving axis speeds and the friction coefficients. The driving torque estimating section 62 calculates the joint angular speeds from the joint axis angular positions calculated by the position sensors. Then, the driving torque estimating section 62 calculates joint angular acceleration rates from the calculated joint angular speeds. The driving torque estimating section 62 reads link parameters pre-stored in the memory, and calculates inertia moments of the links from the link parameters and the joint axis angular positions calculated by the position sensors. The driving torque estimating section 62 calculates the inertia force torque from the calculated joint angular acceleration rates and the calculated inertia moments of the links. The driving torque estimating section 62 reads the link parameters pre-stored in the memory, calculates the gravitational forces applied to the links from the joint axis angular positions calculated by the position sensors by use of the link parameters, and calculates the gravitational force torque for compensating the gravitational forces. The driving torque estimating section 62 calculates the estimated values of the driving torque by adding the frictional force torque, the inertia force torque, and the gravitational force torque.

Then, the controller 3 sends the monitoring signals generated in step S1 to the monitoring device 4 once in every predetermined periods (step S32 of FIG. 3). The monitoring signals include the sensor current values of the currents flowing through the servo motors M1 to M6 which are detected by the current sensors 5, and the estimated values of the driving torque required to drive the servo motors M1 to M6, which have been calculated by the driving torque estimating section 62.

Figure 4:
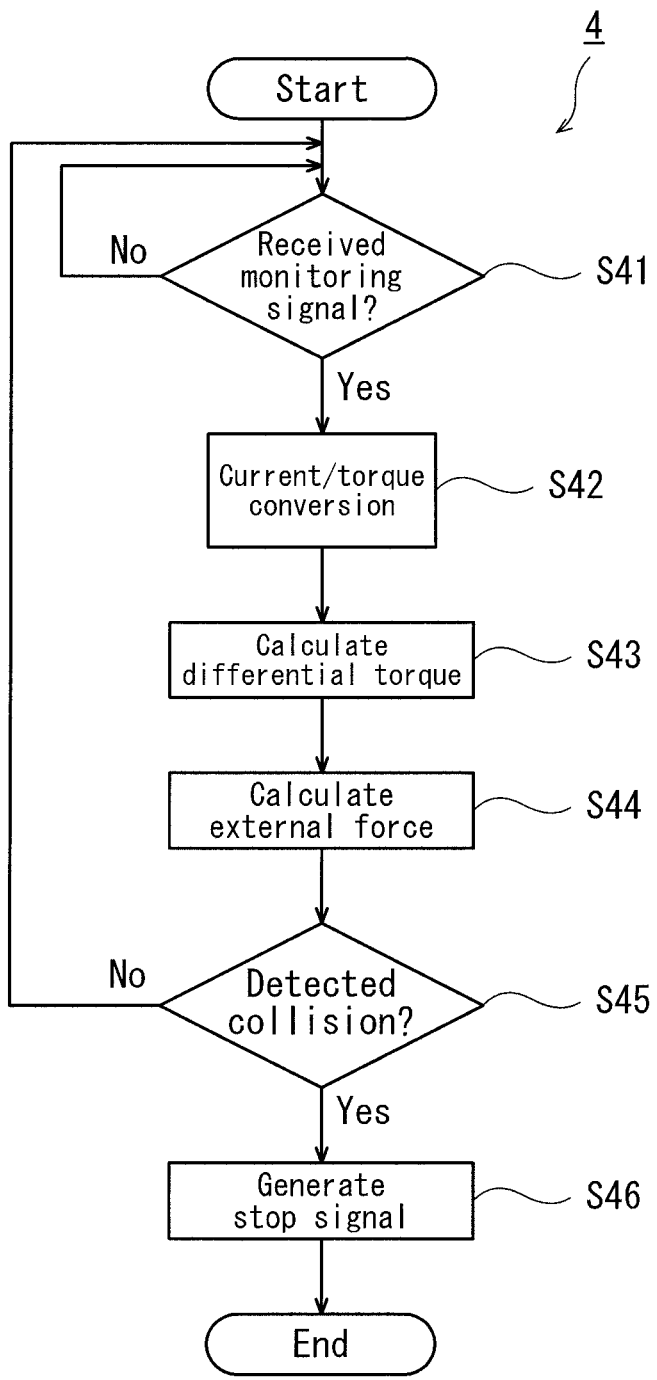
FIG. 4 is a flowchart showing a flow of processing performed by the monitoring device.

As shown in FIG. 4, the monitoring device 4 receives the monitoring signals sent from the controller 3 once in every predetermined periods (step S41 of FIG. 4).

Receiving the monitoring signals, the current/torque converting section 41 of the monitoring device 4 converts the sensor current values of the currents flowing through the servo motors M1 to M6 which have been detected by the current sensors 5, into the torque values (step S42 of FIG. 4). The current/torque converting section 41 converts the input sensor current values into the torque values, and outputs the torque values to the differential torque calculating section 42.

Then, the differential torque calculating section 42 calculates as the differential torque values, the differences between the torque values obtained by the conversion in the current/torque converting section 41 and the estimated values of the driving torque (step S43 of FIG. 4). The adder/subtracter 51 calculates the differential torque values by subtracting the estimated values of the driving torque received from the driving torque estimating section 62, from the torque values of the servo motors M1 to M6 received from the current/torque converting section 41, and outputs the differential torque values to the external force converting section 43 (see FIG. 2).

Then, the external force converting section 43 converts the differential torque values calculated by the differential torque calculating section 42 into the value of the external force applied to the robot 2 (step S44 of FIG. 4). In this case, the external force converting section 43 derives the value of the external force $f_d$ applied to the tip end of the robot 2 from the differential torque values Td received from the differential torque calculating section 42, according to the following formula (1) based on a principle of a virtual work:

$$f_d = (J^T)^{-1} \tau d \tag{1}$$

J indicates Jacobian matrix which is a matric representing a minute displacement relation between a robot coordinate system and the joint axis coordinate system. Regarding the Jacobian matrix J, an error Δx and a joint angular difference Δθ satisfies a relation of formula (2):

$$\Delta x = J \Delta \theta \tag{2}$$

The external force converting section 43 converts the differential torque values Td into the value of the external force $f_d$ applied to the robot 2 by multiplying the differential torque Td by an inverse matrix of transposed matrix $J^T$ of the Jacobian matrix J, and outputs the external force value $f_d$ to the stop signal generating section 44. The external force $f_d$ of the formula (1) is an external force in a case where it is assumed that the external force is applied to the tip end of the robot 2. In a case where the application point of the external force $f_d$ is other than the tip end of the robot 2, coordinate transformation of the external force $f_d$ may be performed to obtain an external force at an actual application point.

Then, the stop signal generating section 44 detects whether or not the robot 2 has collided with the operator based on the external force value obtained by the conversion in the external force converting section 43 (step S45 of FIG. 4). Specifically, the first collision determiner section 52 of FIG. 2 determines whether or not the external force value $|f_d|$ received from the external force converting section 43 is larger than the preset first threshold $f_{th1}$. In a case where the first collision determiner section 52 determines that the external force value $|f_d|$ is larger than the preset first threshold $f_{th1}$, the first collision determiner section 52 determines that the robot 2 has collided with the operator, generates the first stop signal, and outputs the first stop signal to the controller 3 (step S46 of FIG. 4). The external force value $|f_d|$ to be compared to the first threshold $f_{th1}$, is the scalar value of the external force $f_d$. In the present embodiment, the second collision determiner section 54 of FIG. 2 determines whether or not the output value of the low pass filter 53 is larger than the preset second threshold $f_{th2}$. In a case where the second collision determiner section 54 determines that the output value of the low pass filter 53 is larger than the second threshold $f_{th2}$, the second collision determiner section 54 generates the second stop signal for the robot 2 and outputs the second stop signal to the controller 3 (step S46 of FIG. 4). The output value of the low pass filter 53 to be compared to the second threshold $f_{th2}$ is also the scalar value. By use of the low pass filter 53, it becomes possible to suitably perform collision determination while suppressing a noise component without excessively responding to a change in the value $f_d$ of the external force momentarily applied to the robot 2.

The first threshold $f_{th1}$ (100 N) and the second threshold $f_{th2}$ (80 N) are set to desired values, respectively, in advance by a manager. In a case where the thresholds used to determine occurrence of a collision are current values, the manager is required to estimate the external force applied to the robot 2 based on the current values. Therefore, it is difficult to set the thresholds. However, since it is determined whether or not the value of the external force applied to the robot is larger than the preset thresholds, the manager can easily set the thresholds. For example, the external force value such as 100 N can be set as the threshold.

As shown in FIG. 3, receiving the stop signal from the monitoring device 4 (YES in step S33 of FIG. 3), the controller 3 stops the operation (movement) of the robot 2. The robot 2 may be stopped in a desired manner. For example, the robot 2 may be stopped promptly by cutting off a driving force (emergency stop), may be stopped by cutting off the driving force and reducing the speed of the robot 2 (speed reduction stop), or may be stopped by reducing the speed without cutting off the driving force (temporal stop).

In accordance with the present embodiment, the monitoring device 4 detects the values of the currents flowing through the motors for driving the joint axes of the robot 2, converts the detected current values into the torque values, and converts the torque values into the value of the external force applied to the robot 2. Since the value of the external force $f_d$ applied to the robot 2 is directly calculated, a collision of the robot 2 can be detected with high accuracy during the operation. Thus, the controller 3 can safely stop the robot 2.

Although in the present embodiment, the driving torque estimating section 62 calculates the gravitational force torque, the inertia force torque, and the frictional force torque and adds these torque to derive the estimated values of the driving torque, at least one of the gravitational force torque, the inertia force torque, and the frictional force torque may be used as the estimated values of the driving force.

Hereinafter, Embodiment 2 to Embodiment 5 of the present invention will be described. Hereinafter, the same constituents as those of Embodiment 1 will not be described, and different constituents will be mainly described.

Figure 5:
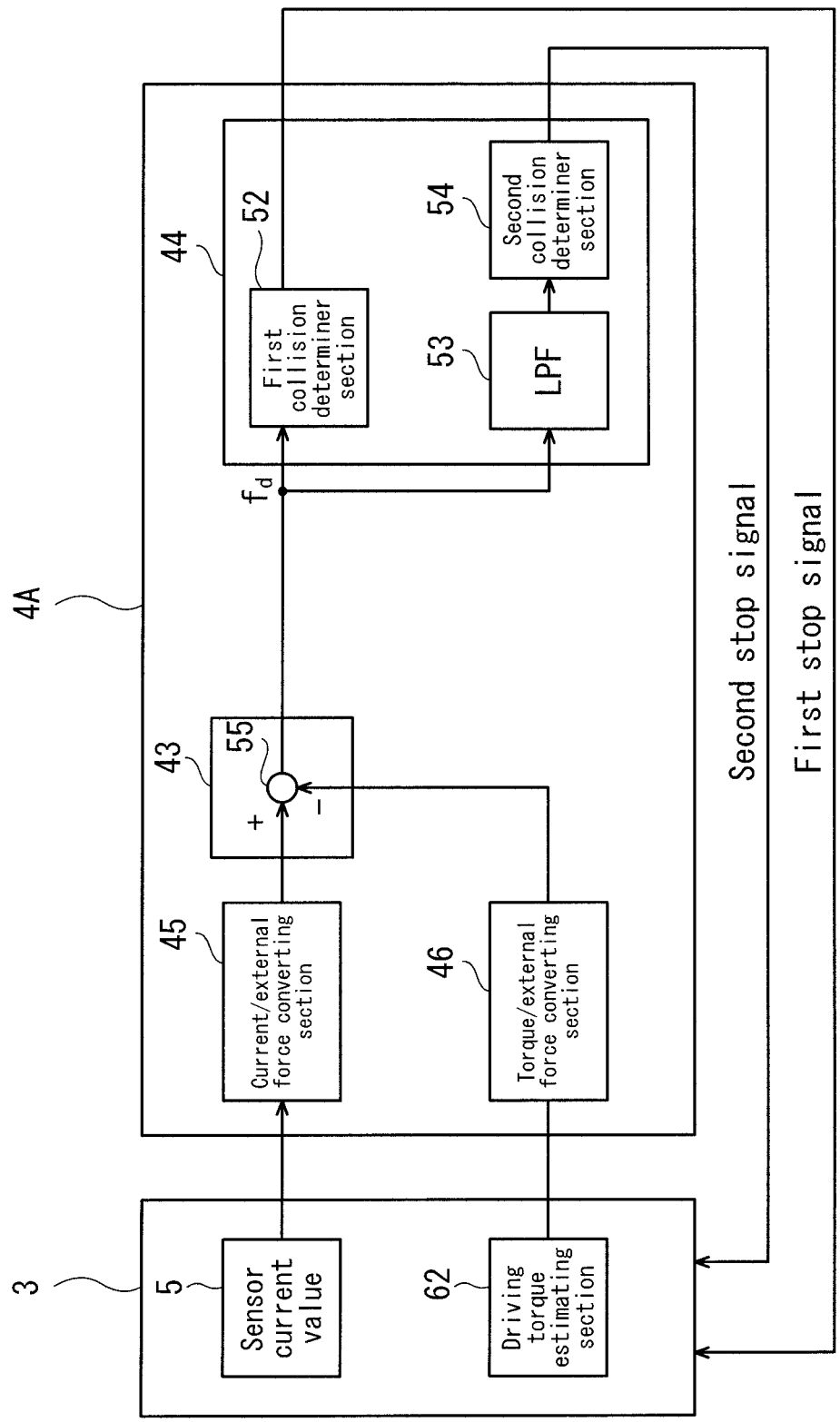
FIG. 5 is a block diagram showing the configuration of a monitoring device according to Embodiment 2 of the present invention.

FIG. 5 is a block diagram showing the configuration of a monitoring device according to Embodiment 2 of the present invention. As shown in FIG. 5, Embodiment 2 is different from Embodiment 1 (see FIG. 2) in that a monitoring device 4A includes a current/external force converting section 45 which converts the values of the currents flowing through the servo motors, which have been detected by the current sensors 5, respectively, into the detection value of the external force applied to the robot 2, and a torque/external force converting section 46 which converts the estimated values of the driving torque into the estimated value of the external force applied to the robot 2, and the external force converting section 43 calculates difference between the detection value of the external force applied to the robot 2 and the estimated value of the external force applied to the robot 2 to obtain (derive) the value of the external force applied to the robot 2.

The current/external force converting section 45 converts the current i into the external force f applied to the robot 2 by the calculation by use of the Jacobian matrix J in which a specified point of the robot 2 (e.g., the tip end of the robot 2) is the application point of the external force, according to the following formula (3). In formula (3), X indicates the conversion from the current i into the torque τ.

$$f=(J^T)^{-1}Xi \qquad (3)$$

The torque/external force converting section 46 converts the torque τ into the external force f applied to the robot 2 by use of the Jacobian matrix J in which the specified point of the robot 2 (e.g., the tip end of the robot 2) is the application point of the external force (see formula (1)).

The stop signal generating section 44 generates the first stop signal and the second stop signal based on the external force value obtained by the conversion in the external force converting section 43 (adder/subtracter 55), and supplies the first stop signal and the second stop signal to the controller 3.

Figure 6:
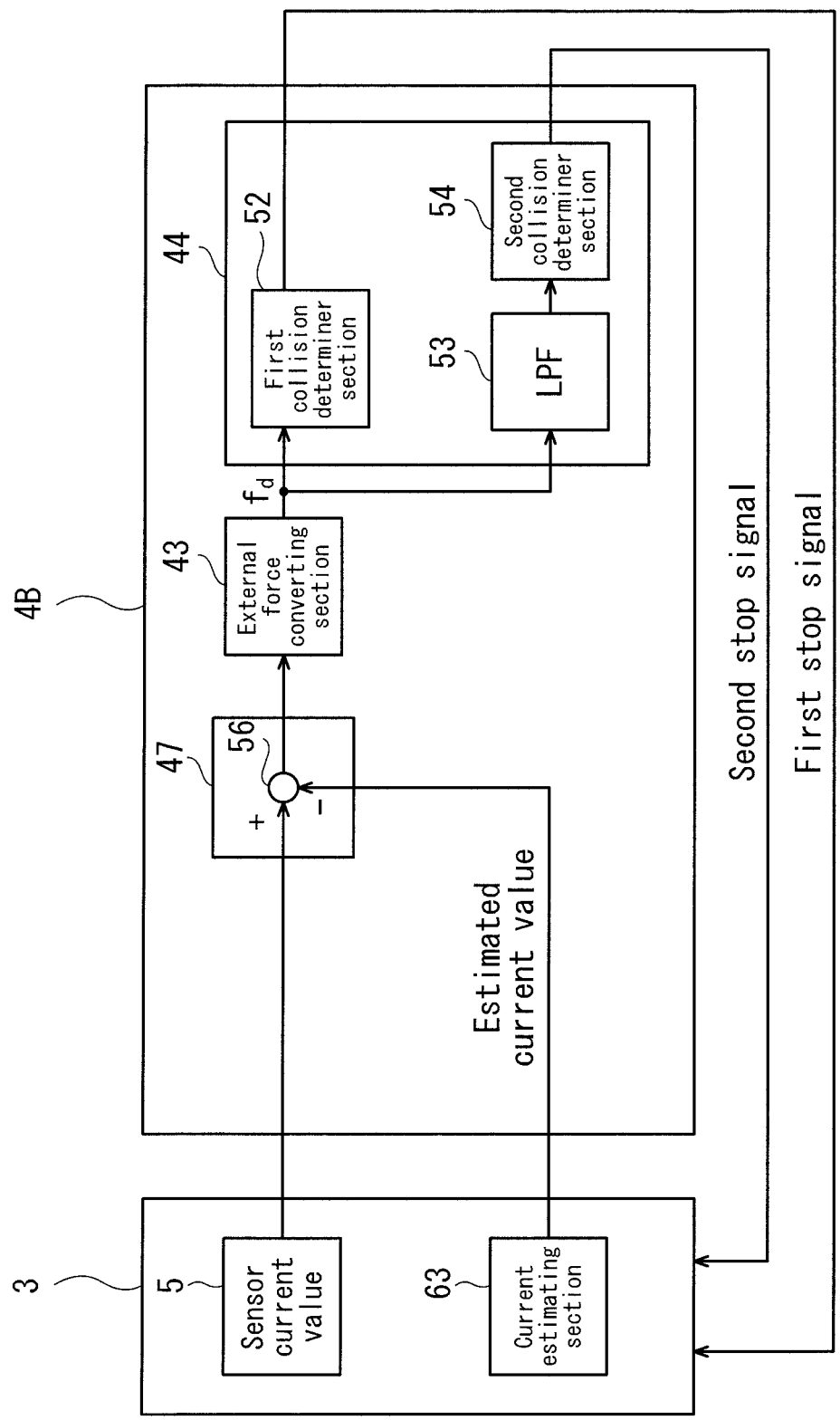
FIG. 6 is a block diagram showing the configuration of a monitoring device according to Embodiment 3 of the present invention.

FIG. 6 is a block diagram showing the configuration of a monitoring device according to Embodiment 3 of the present invention. As shown in FIG. 6, Embodiment 3 is different from Embodiment 1 (see FIG. 2) in that the controller 3 includes a current estimating section 63 which estimates the values of the currents flowing through the servo motors, and a monitoring device 4B includes a differential current calculating section 47 which calculates difference currents between the detection values of the currents flowing through the servo motors which have been detected by the current sensors 5 and the estimated values of the currents flowing through the servo motors, and the external force converting section 43 converts the differential currents calculated by the differential current calculating section 47 (adder/subtracter 56) into the external force applied to the robot 2.

The external force converting section 43 converts the current i into the external force f applied to the robot 2 by calculation by use of the Jacobian matrix J in which the specified point of the robot 2 (e.g., the tip end of the robot 2) is the application point of the external force, according to the above following formula (3). The stop signal generating section 44 generates the first stop signal and the second stop signal for the robot 2 based on the value of the external force obtained by the conversion in the external force converting section 43, and supplies the first stop signal and the second stop signal to the controller 3.

Figure 7:
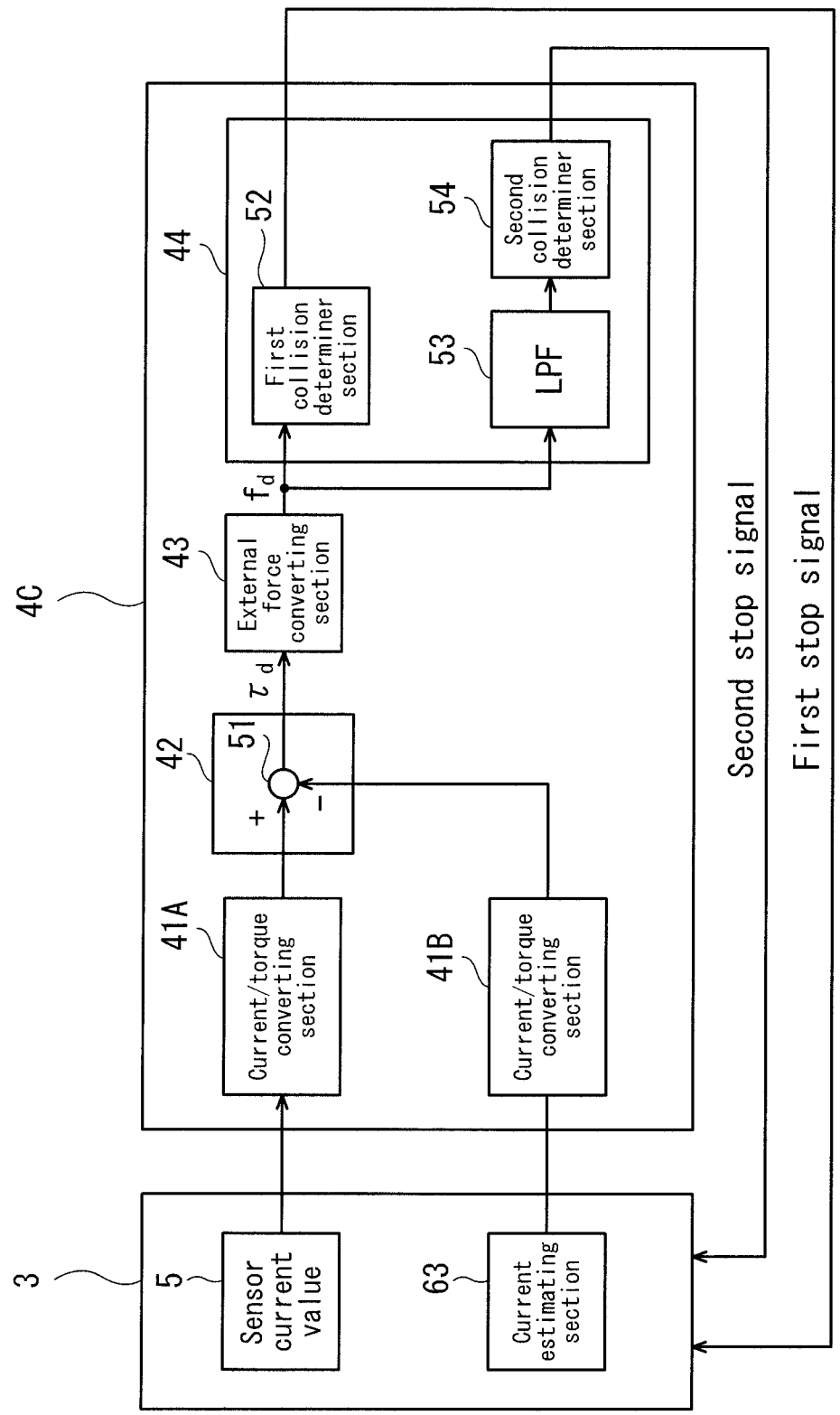
FIG. 7 is a block diagram showing the configuration of a monitoring device according to Embodiment 4 of the present invention.

FIG. 7 is a block diagram showing the configuration of a monitoring device according to Embodiment 4 of the present invention. As shown in FIG. 7, Embodiment 4 is different from Embodiment 1 (see FIG. 2) in that the controller 3 includes the current estimating section 63 which estimates the values of the currents flowing through the servo motors, and a monitoring device 4C includes a current/torque converting section 41A which converts the values of the currents flowing through the servo motors which have been detected by the current sensors 5 into the detection values of the torque, and a current/torque converting section 41B which converts the estimated values of the currents flowing through the servo motors into the estimated values of the torque.

The current/torque converting sections 41A, 41B convert the current i into the torque τ by the calculation according to the following formula (4):

$$\tau = Xi \qquad (4)$$

The external force converting section 43 converts the torque τ into the external force f by use of the Jacobian matrix J in which the specified point of the robot 2 (e.g., the tip end of the robot 2) is the application point of the external force (see formula (1)).

Figure 8:
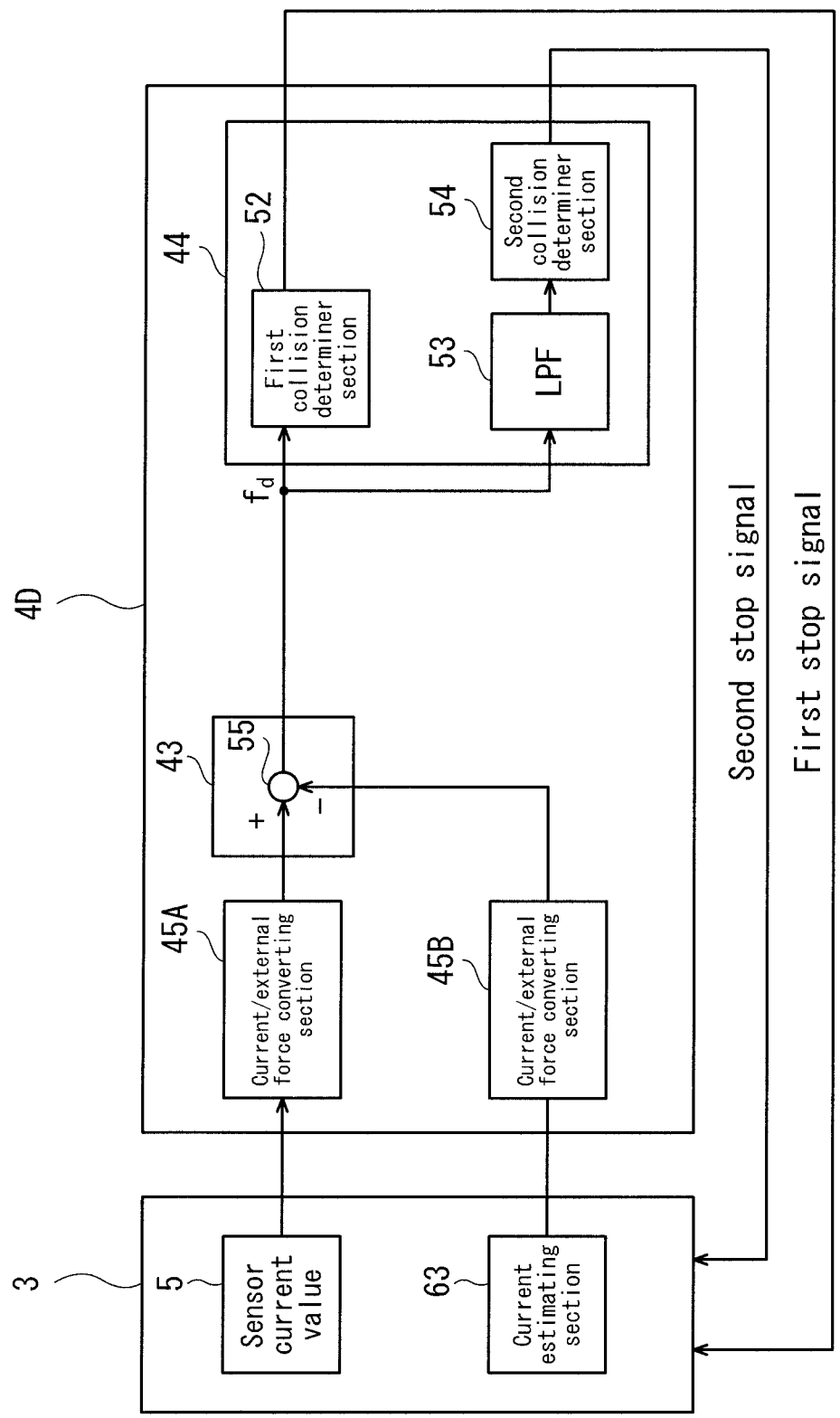
FIG. 8 is a block diagram showing the configuration of a monitoring device according to Embodiment 5 of the present invention.

FIG. 8 is a block diagram showing the configuration of a monitoring device according to Embodiment 5 of the present invention. As shown in FIG. 8, Embodiment 3 is different from Embodiment 1 (see FIG. 2) in that the controller 3 includes the current estimating section 63 which estimates the values of the currents flowing through the servo motors, a monitoring device 4D includes a current/external force converting section 45A which converts the values of the currents flowing through the servo motors which have been detected by the current sensors 5 into the detection value of the external force applied to the robot 2, and a current/external force converting section 45B which converts the estimated values of the currents flowing through the servo motors which have been obtained (derived) by the current estimating section 63 into the estimated value of the external force applied to the robot 2, and the external force converting section 43 calculates the difference between the detection value of the external force applied to the robot and the estimated value of the external force applied to the robot to obtain (derive) the external force applied to the robot 2.

The current/external force converting sections 45A and 45B convert the current i into the external force f applied to the robot 2 by use of the Jacobian matrix J in which the specified point of the robot 2 (e.g., the tip end of the robot 2) is the application point of the external force (see formula (3)).

The estimated values of the currents flowing through the servo motors which are derived by the current estimating section 63 of FIGS. 6 to 8 may be the current command values calculated by the current command value generating section 61 of the controller 3, based on the predetermined position command values and the joint axis angular positions received from the position sensors, or may be calculated by other known methods. Further, the current estimating section 63 may be included in each of the monitoring devices 4B to 4D.

Although in the above-described embodiments, the monitoring device 4 is provided separately from the controller 3, it may be included in the controller 3. For example, the processor 6 of the controller 3 may be configured to execute the functional blocks of the sections (41 to 44) of the monitoring device 4.

The above-described configurations of the monitoring devices 4A to 4D of Embodiment 2 to Embodiment 5 are substantially equivalent to that of the monitoring device 4 of Embodiment 1. Therefore, in Embodiment 2 to Embodiment 5, the same advantages as those of Embodiment 1 can be obtained.

Other Embodiments

Although in the above-described embodiments, the monitoring device 4 includes the first collision determiner section 52 which determines occurrence of a collision based on the external force value which does not pass through the low pass filter 53 and the second collision determiner section 54 which determines occurrence of a collision based on the external force value which has passed through the low pass filter 53, the configuration of the monitoring device 4 is not limited to this. The monitoring device 4 may include only the first collision determiner section 52 or the second collision determiner section 54.

Further, occurrence of a collision may be determined by comparing a change amount of the external force value to a predetermined threshold. This makes it possible to detect a rapid change in the external force applied to the robot.

Although in the above-described embodiments, the robot 2 is the six-axis articulated (multi-joint) robot, the robot 2 is not limited to this so long as it includes at least one axis. Further, the robot 2 may be a double (dual)-arm robot including two arms.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

INDUSTRIAL APPLICABILITY

The present invention is applicable to monitoring of an articulated (multi-joint) robot.

REFERENCE SIGNS LIST 1 robot system
2 robot
3 controller
4, 4A to 4D monitoring device
5 current sensor
6 processor
7 servo amplifier
41, 41A, 41B current/torque converting section
42 differential torque calculating section
43 external force converting section
44 stop signal generating section
45, 45A, 45B current/external force converting section
46 torque/external force converting section
47 differential current calculating section
51 adder/subtracter (torque)
52 first collision determiner section
53 low pass filter
54 second collision determiner section
55 adder/subtracter (external force)
56 adder/subtracter (current)
61 current value generating section
62 driving torque estimating section
63 current estimating section
J1 to J6 joint axis
M1 to M6 servo motor
L1 to L6 power supply line

The invention claimed is:

1. A monitoring device of a robot system, the robot system including:
a robot including at least one joint axis and at least one servo motor which drives the joint axis, and a controller which controls the servo motor which drives the joint axis,
the monitoring device comprising:
a current sensor which detects a value of a current flowing through the servo motor;
a current/torque converting section which converts the value of the current flowing through the servo motor which has been detected by the current sensor into a torque value;
a driving torque estimating section which estimates at least a part of driving torque required to drive the servo motor;
a differential torque calculating section which calculates differential torque between the torque value obtained by conversion in the current/torque converting section and an estimated value of the driving torque;
an external force converting section which converts the differential torque calculated by the differential torque calculating section into an external force applied to the robot; and
a stop signal generating section which generates a stop signal for the robot based on a value of the external force obtained by conversion in the external force converting section, and supplies the stop signal to the controller.

2. A monitoring device of a robot system, the robot system including:
a robot including at least one joint axis and at least one servo motor which drives the joint axis, and a controller which controls the servo motor which drives the joint axis,
the monitoring device comprising:
a current sensor which detects a value of a current flowing through the servo motor;
a current/ external force converting section which converts the value of the current flowing through the servo motor which has been detected by the current sensor into a detection value of an external force applied to the robot;
a driving torque estimating section which estimates at least a part of driving torque required to drive the servo motor;
a torque/external force converting section which converts an estimated value of the driving torque into an estimated value of the external force applied to the robot;
an external force converting section which calculates a difference between a detection value of the external force applied to the robot and the estimated value of the external force applied to the robot to obtain the external force applied to the robot; and
a stop signal generating section which generates a stop signal for the robot based on a value of the external force obtained by conversion in the external force converting section, and supplies the stop signal to the controller.

3. A monitoring device of a robot system, the robot system including:
a robot including at least one joint axis and at least one servo motor which drives the joint axis, and a controller which controls the servo motor which drives the joint axis,
the monitoring device comprising:
a current sensor which detects a value of a current flowing through the servo motor;
a current estimating section which estimates the value of the current flowing through the servo motor;
a differential current calculating section which calculates a differential current between a detection value of the current flowing through the servo motor and an estimated value of the current flowing through the servo motor;
an external force converting section which converts the differential current calculated by the differential current calculating section into an external force applied to the robot; and a stop signal generating section which generates a stop signal for the robot based on a value of the external force obtained by conversion in the external force converting section, and supplies the stop signal to the controller.

4. A monitoring device of a robot system, the robot system including:
a robot including at least one joint axis and at least one servo motor which drives the joint axis, and a controller which controls the servo motor which drives the joint axis,
the monitoring device comprising:
a current sensor which detects a value of a current flowing through the servo motor;
a first current/torque converting section which converts the value of the current flowing through the servo motor which has been detected by the current sensor into a detection value of torque;
a current estimating section which estimates the value of the current flowing through the servo motor;
a second current/torque converting section which converts an estimated value of the current flowing through the servo motor which has been obtained by the current estimating section into an estimated value of the torque;
a differential torque calculating section which calculates differential torque between a detection value of the torque and the estimated value of the torque;
an external force converting section which converts the differential torque calculated by the differential torque calculating section into an external force applied to the robot; and
a stop signal generating section which generates a stop signal for the robot based on a value of the external force obtained by conversion in the external force converting section, and supplies the stop signal to the controller.

5. A monitoring device of a robot system, the robot system including:
a robot including at least one joint axis and at least one servo motor which drives the joint axis, and a controller which controls the servo motor which drives the joint axis,
the monitoring device comprising:
a current sensor which detects a value of a current flowing through the servo motor;
a current estimating section which estimates the value of the current flowing through the servo motor;
a first current/external force converting section which converts the value of the current flowing through the servo motor which has been detected by the current sensor into a detection value of an external force applied to the robot;
a second current/external force converting section which converts an estimated value of the current flowing through the servo motor which has been obtained by the current estimating section into an estimated value of the external force applied to the robot;
an external force converting section which calculates a difference between the detection value of the external force applied to the robot and the estimated value of the external force applied to the robot, to obtain the external force applied to the robot; and
a stop signal generating section which generates a stop signal for the robot based on a value of the external force obtained by conversion in the external force converting section, and supplies the stop signal to the controller.

6. The monitoring device of the robot system according to claim 1,
wherein the stop signal generating section generates the stop signal for the robot, in a case where the value of the external force which has been obtained by conversion in the external force converting section is larger than a preset first threshold.

7. The monitoring device of the robot system according to claim 1, further comprising:
a low pass filter which receives as an input the value of the external force obtained by conversion in the external force converting section,
wherein the stop signal generating section generates the stop signal for the robot, in a case where an output value of the low pass filter is larger than a preset second threshold.

8. The monitoring device of the robot system according to claim 1,
wherein the torque is converted into the external force applied to the robot and the current is converted into the external force applied to the robot by calculation by use of Jacobian matrix in which a specified point of the robot is an application point of the external force.

9. The monitoring device of the robot system according to claim 2,
wherein the stop signal generating section generates the stop signal for the robot, in a case where the value of the external force which has been obtained by conversion in the external force converting section is larger than a preset first threshold.

10. The monitoring device of the robot system according to claim 2 , further comprising:
a low pass filter which receives as an input the value of the external force obtained by conversion in the external force converting section,
wherein the stop signal generating section generates the stop signal for the robot, in a case where an output value of the low pass filter is larger than a preset second threshold.

11. The monitoring device of the robot system according to claim 2 ,
wherein the torque is converted into the external force applied to the robot and the current is converted into the external force applied to the robot by calculation by use of Jacobian matrix in which a specified point of the robot is an application point of the external force.

12. The monitoring device of the robot system according to claim 3,
wherein the stop signal generating section generates the stop signal for the robot, in a case where the value of the external force which has been obtained by conversion in the external force converting section is larger than a preset first threshold.

13. The monitoring device of the robot system according to claim 3 , further comprising:
a low pass filter which receives as an input the value of the external force obtained by conversion in the external force converting section,
wherein the stop signal generating section generates the stop signal for the robot, in a case where an output value of the low pass filter is larger than a preset second threshold.

14. The monitoring device of the robot system according to claim 3 ,
wherein the torque is converted into the external force applied to the robot and the current is converted into the external force applied to the robot by calculation by use of Jacobian matrix in which a specified point of the robot is an application point of the external force.

15. The monitoring device of the robot system according to claim 4,
wherein the stop signal generating section generates the stop signal for the robot, in a case where the value of the external force which has been obtained by conversion in the external force converting section is larger than a preset first threshold.

16. The monitoring device of the robot system according to claim 4, further comprising:
a low pass filter which receives as an input the value of the external force obtained by conversion in the external force converting section,
wherein the stop signal generating section generates the stop signal for the robot, in a case where an output value of the low pass filter is larger than a preset second threshold.

17. The monitoring device of the robot system according to claim 4,
wherein the torque is converted into the external force applied to the robot and the current is converted into the external force applied to the robot by calculation by use of Jacobian matrix in which a specified point of the robot is an application point of the external force.

18. The monitoring device of the robot system according to claim 5,
wherein the stop signal generating section generates the stop signal for the robot, in a case where the value of the external force which has been obtained by conversion in the external force converting section is larger than a preset first threshold.

19. The monitoring device of the robot system according to claim 5, further comprising:
a low pass filter which receives as an input the value of the external force obtained by conversion in the external force converting section,
wherein the stop signal generating section generates the stop signal for the robot, in a case where an output value of the low pass filter is larger than a preset second threshold.

20. The monitoring device of the robot system according to claim 5,
wherein the torque is converted into the external force applied to the robot and the current is converted into the external force applied to the robot by calculation by use of Jacobian matrix in which a specified point of the robot is an application point of the external force.

* * * * *